(12) United States Patent
Baldwin

(10) Patent No.: US 7,278,412 B2
(45) Date of Patent: Oct. 9, 2007

(54) COMBUSTION-GAS RECIRCULATION SYSTEM

(75) Inventor: Darryl Dean Baldwin, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 11/094,379

(22) Filed: Mar. 31, 2005

(65) Prior Publication Data

US 2006/0219230 A1    Oct. 5, 2006

(51) Int. Cl.
*F02M 25/07* (2006.01)
*F02M 25/00* (2006.01)

(52) U.S. Cl. ................ 123/568.17; 60/605.2

(58) Field of Classification Search ........... 123/568.15, 123/568.17, 568.11, 572, 559.1; 60/605.2
See application file for complete search history.

(56) References Cited

U.S. PATENT DOCUMENTS

| | | | |
|---|---|---|---|
| 1,704,297 A | | 3/1929 | Leipert |
| 3,370,423 A | | 2/1968 | Vaughan |
| 4,482,365 A | | 11/1984 | Roach |
| 5,533,487 A | * | 7/1996 | Cailey ............... 123/568.17 |
| 5,611,203 A | * | 3/1997 | Henderson et al. ........ 60/605.2 |
| 5,884,612 A | | 3/1999 | Takeyama et al. |
| 6,237,336 B1 | | 5/2001 | Feucht et al. |
| 6,267,106 B1 | | 7/2001 | Feucht |
| 6,439,174 B1 | | 8/2002 | Shea et al. |
| 6,502,397 B1 | * | 1/2003 | Lundqvist ............... 60/605.2 |
| 6,609,374 B2 | | 8/2003 | Feucht et al. |
| 6,640,542 B2 | * | 11/2003 | Coleman et al. ........... 60/605.2 |
| 6,659,092 B2 | * | 12/2003 | Coleman et al. ....... 123/568.17 |
| 6,748,741 B2 | | 6/2004 | Martin et al. |

FOREIGN PATENT DOCUMENTS

DE    004420247 A1    12/1995

* cited by examiner

*Primary Examiner*—Mahmoud Gimie
(74) *Attorney, Agent, or Firm*—Finnegan, Henderson, Farabow, Garrett & Dunner

(57) ABSTRACT

A combustion-gas recirculation system has a mixing chamber with a mixing-chamber inlet and a mixing-chamber outlet. The combustion-gas recirculation system may further include a duct connected to the mixing-chamber inlet. Additionally, the combustion-gas recirculation system may include an open inlet channel with a solid outer wall. The open inlet channel may extend into the mixing chamber such that an end of the open inlet channel is disposed between the mixing-chamber inlet and the mixing-chamber outlet. Furthermore, air within the open inlet channel may be at a pressure near or below atmospheric pressure.

23 Claims, 2 Drawing Sheets

COMBUSTION-GAS RECIRCULATION SYSTEM

GOVERNMENT RIGHTS

This invention was made with Government support under the terms of Contract No. DE-FC26-01CH11079 awarded by the Department of Energy. The Government may have certain rights in this invention.

TECHNICAL FIELD

The present disclosure relates to a recirculation system and, more particularly, to a combustion-gas recirculation system for an engine.

BACKGROUND

Engines produce power by combusting fuel and air in a combustion chamber to produce high-pressure combustion gases that drive a working member of the engine, such as a piston. Some of the combustion gases produced by an engine may be noxious. The combustion gases produced during operation of an engine may travel from the combustion chamber to the atmosphere, either through an exhaust system or through other portions of the engine, such as a crankcase.

At least one internal combustion engine has been conceived with provisions for recirculating at least a portion of the combustion gases produced by the engine back to the combustion chamber to reduce the quantity of noxious combustion gases emitted to the atmosphere. For example, U.S. Pat. No. 5,884,612 ("the '612 patent") shows an engine with a blowby gas ventilation system for recirculating combustion gas from the crankcase to the combustion chambers of the engine. The engine includes a throttle body that channels air to a surge tank. The throttle body includes a butterfly valve that the air travels across as it flows to the surge tank. The engine also has a blowby gas ventilation pipe that directs combustion gases from the crankcase into the surge tank. The surge tank distributes the air and combustion gases to intake pipes, which channel the air and combustion gases to the combustion chambers of the engine.

Although the engine of the '612 patent recirculates combustion gases from the crankcase to the cylinders of the engine, the design includes disadvantages. For example, the butterfly valve in the throttle body presents a restriction to air flowing to the combustion chambers of the engine. This restriction may compromise the performance of the engine by reducing the airflow to the combustion chambers of the engine. The inclusion of the butterfly valve may also increase cost and maintenance requirements of the engine.

The combustion-gas recirculation system of the present disclosure solves one or more of the problems set forth above.

SUMMARY OF THE INVENTION

One disclosed embodiment includes a combustion-gas recirculation system that may include a mixing chamber with a mixing-chamber inlet and a mixing-chamber outlet. The combustion-gas recirculation system may further include a duct connected to the mixing-chamber inlet. Additionally, the combustion-gas recirculation system may include an open inlet channel with a solid outer wall. The open inlet channel may extend into the mixing chamber such that an end of the open inlet channel is disposed between the mixing-chamber inlet and the mixing-chamber outlet. Furthermore, air within the open inlet channel may be at a pressure near or below atmospheric pressure.

Another embodiment relates to a method of supplying air and a second gas to a combustion chamber of an engine. The method may include directing air through an open inlet channel at a pressure near or below atmospheric pressure, through an end of the open inlet channel disposed inside a mixing chamber between a mixing-chamber inlet and a mixing-chamber outlet, through the mixing chamber, through the mixing-chamber outlet, to the combustion chamber. Additionally, the method may include directing the second gas through a duct, through the mixing-chamber inlet into the mixing chamber, through the mixing chamber, through the mixing-chamber outlet, to the combustion chamber.

A further embodiment relates to an engine. The engine may include a housing that may include a combustion chamber. Additionally, the engine may include an air-intake system. The air-intake system may include a mixing chamber with a mixing-chamber inlet and a mixing-chamber outlet. The mixing-chamber outlet may be connected to the combustion chamber. Furthermore, the air-intake system may include an open inlet channel. A first end of the open inlet channel may be in fluid communication with the atmosphere. Additionally, the open inlet channel may extend into the mixing chamber such that a second end of the open inlet channel is disposed between the mixing-chamber inlet and the mixing-chamber outlet. Furthermore, the air-intake system may configured such that, during operation of the engine, air travels through the open inlet channel at a pressure near or below atmospheric pressure.

DETAILED DESCRIPTION

Figure 1:
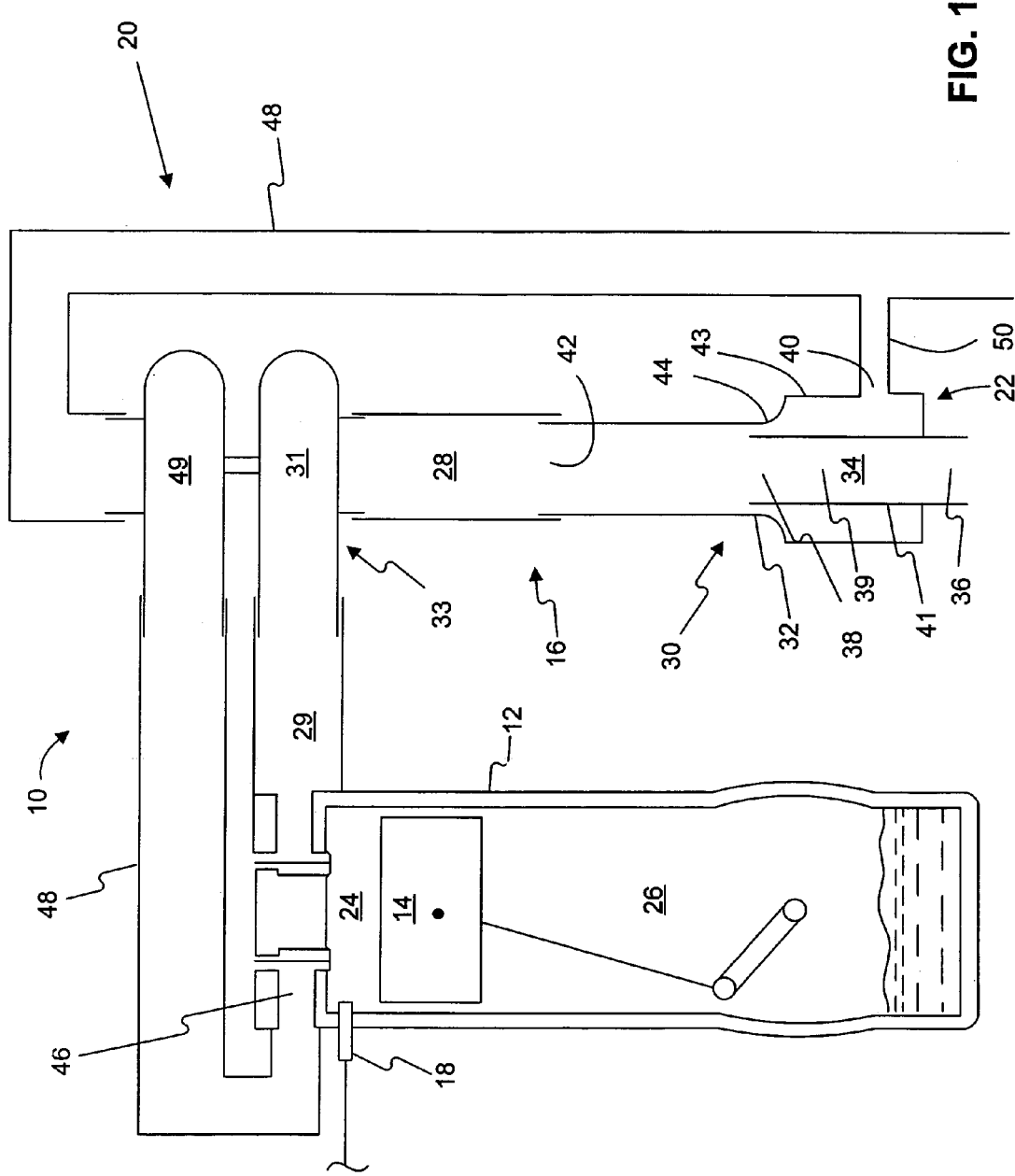
FIG. 1 is a schematic illustration of an engine according to one disclosed embodiment.

FIG. 1 provides a schematic illustration of an engine 10 according to an exemplary disclosed embodiment. Engine 10 may include a housing 12, a working member 14, an air-intake system 16, a fuel system 18, an exhaust system 20, and a combustion-gas recirculation system 22.

Working member 14 may be movably supported in an interior of housing 12 such that it separates a combustion chamber 24 from a non-combustion chamber 26. As shown in FIG. 1, working member 14 may be a piston supported in a cylindrical portion of housing 12. Housing 12, working member 14, combustion chamber 24, and non-combustion chamber 26 are not limited to the configuration shown in FIG. 1. Working member 14 may have any shape and may be movably supported within housing 12 in any manner such that it separates combustion chamber 24 from non-combustion chamber 26. For example, working member 14 may be a rotor that rotates within housing 12, as in a Wankel type internal combustion engine.

Air-intake system 16 may be connected to housing 12 and configured to supply air to combustion chamber 24. Air-intake system 16 may include ducts 28 and 29 for routing air to combustion chamber 24 and a compressor 31 of a supercharger 33 for pumping air through duct 29. Air-intake system 16 may also include an eductor 30 for routing air to duct 28 and also for introducing a second gas into the air-intake system 16 and delivering that second gas to duct 28. Additionally, air-intake system 16 may include plenums, manifolds, valves, and/or filters (not shown). Furthermore, air-intake system 16 may omit supercharger 33.

Eductor 30 may include a mixing chamber 32 and an open inlet channel 34 that extends into mixing chamber 32. A first end 36 of open inlet channel 34 may be in fluid communication with the atmosphere, either directly, as shown in FIG. 1, or through one or more other components of air-intake system 16 such as ducts, plenums, chambers, filters, and/or superchargers. A second end 38 of open inlet channel 34 may be disposed within mixing chamber 32. An interior 39 of open inlet channel 34 is free of valves, shutters, and similar air-flow restrictions. Additionally, in some embodiments, open inlet channel 34 may have a substantially constant inner cross-section. Consistent with certain embodiments, open inlet channel 34 may have a solid outer wall 41, as shown in FIG. 1.

Mixing chamber 32 may also include a mixing-chamber inlet 40 and a mixing-chamber outlet 42. Mixing-chamber outlet 42 may be connected to combustion chamber 24, such as by ducts 28 and 29 and compressor 31. Mixing-chamber inlet 40 may be disposed on a side of second end 38 of open inlet channel 34 opposite mixing-chamber outlet 42. Mixing chamber 32 may be configured with an enlarged portion 43 located between mixing-chamber inlet 40 and second end 38 of open inlet channel 34 and having a cross-section that is larger than cross-sections between second end 38 of open inlet channel 34 and mixing-chamber outlet 42. Additionally, mixing chamber 32 may include a tapered portion 44 between mixing-chamber inlet 40 and second end 38 of open inlet channel 34. Furthermore, a portion of mixing chamber 32 between second end 38 of open inlet channel 34 and mixing-chamber outlet 42 may have a substantially constant inner cross-section.

Eductor 30 is not limited to the configuration illustrated in FIG. 1. For example, mixing chamber 32 may have a different distribution of cross-sectional areas between mixing-chamber inlet 40 and mixing-chamber outlet 42. Additionally, while FIG. 1 shows open inlet channel 34 and mixing chamber 32 extending along a straight axis, open inlet channel 34 and/or mixing chamber 32 may curve between first end 36 of open inlet channel 34 and mixing-chamber outlet 42. Furthermore, in addition to open inlet channel 34, other ducts may extend into or from mixing chamber 32. Moreover, mixing chamber 32 may include other inlets and outlets in addition to mixing-chamber inlet 40 and mixing-chamber outlet 42.

Fuel system 18 may be configured to deliver fuel to combustion chamber 24. Fuel system 18 may be configured to deliver fuel directly into combustion chamber 24, as shown in FIG. 1. Alternatively, fuel system 18 may be configured to deliver fuel into air-intake system 16, to be carried to combustion chamber 24 by air in air-intake system 16. Fuel system 18 may be configured to deliver fuels including, but not limited to, diesel fuel, gasoline, and gaseous fuels.

Exhaust system 20 may be configured to expel combustion gases from combustion chamber 24. Exhaust system 20 may include a passage 46 in housing 12, ducts 48, and a turbine housing 49 for routing combustion gases to the atmosphere. Exhaust system 20 may further include one or more gas treatment units, and/or one or more mufflers (not shown).

Combustion-gas recirculation system 22 may be configured to recirculate combustion gas from exhaust system 20 to air-intake system 16 for delivery to combustion chamber 24. Combustion-gas recirculation system 22 may include eductor 30 and a duct 50 connected between exhaust system 20 and mixing-chamber inlet 40. Duct 50 may be defined entirely by components separate from housing 12, as is shown in FIG. 1. Alternatively, housing 12 may define part or all of duct 50. In addition to eductor 30 and duct 50, combustion-gas recirculation system 22 may include other components such as one or more valves, sensors, controllers, pumps, and/or filters.

Figure 2:
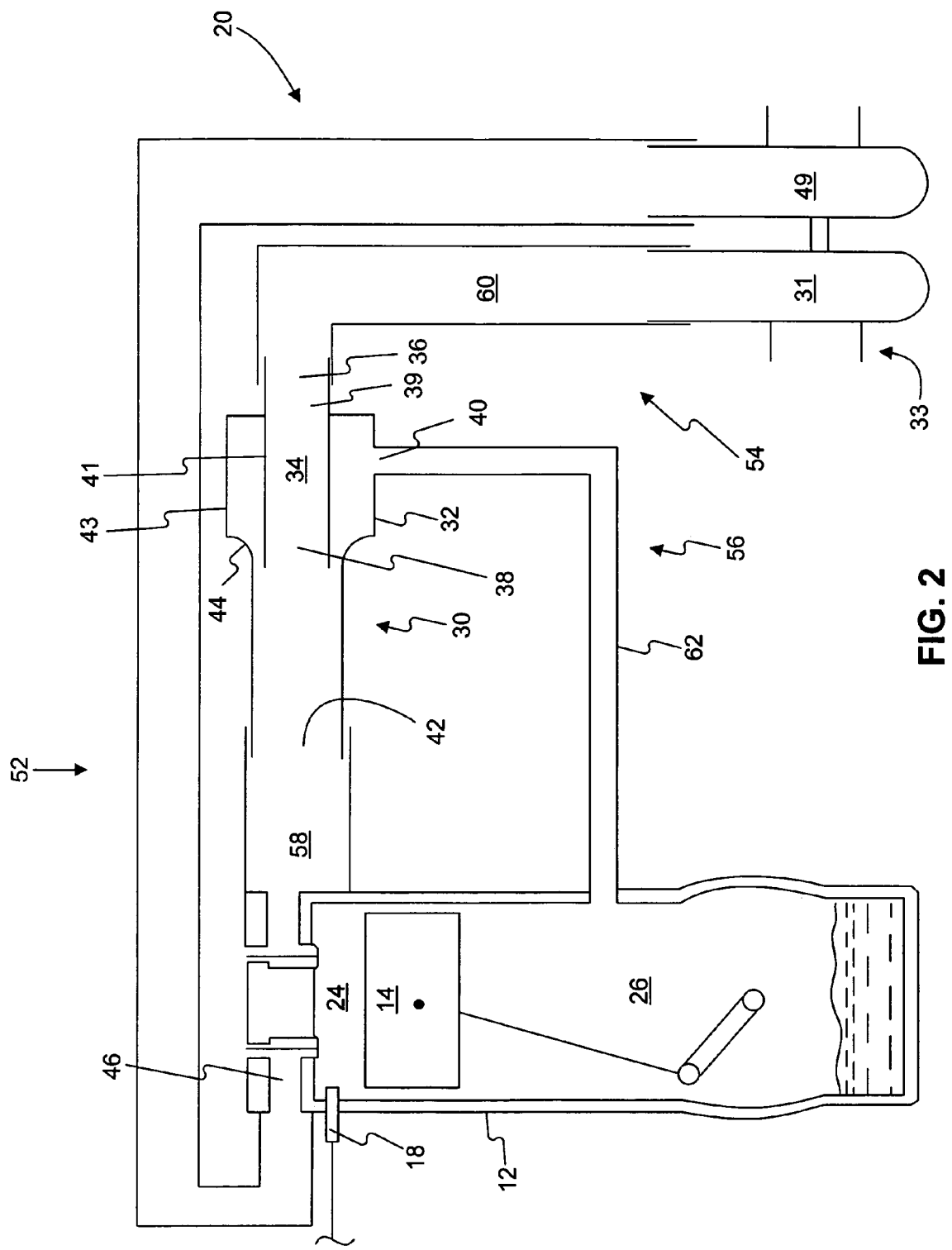
FIG. 2 is a schematic illustration of an engine according to another disclosed embodiment.

FIG. 2 illustrates an alternative embodiment of an engine 52, including an alternative embodiment of a combustion-gas recirculation system 56. Combustion-gas recirculation system 56 may be configured to recirculate combustion gases from non-combustion chamber 26 to air-intake system 16 for delivery to combustion chamber 24. Combustion-gas recirculation system 56 may include eductor 30 and a duct 62 connected between non-combustion chamber 26 and mixing-chamber inlet 40. Duct 62 may be defined entirely by components separate from housing 12, as is shown in FIG. 2. Alternatively, housing 12 may define part or all of duct 62. In addition to eductor 30 and duct 62, combustion-gas recirculation system 56 may include other components such as one or more valves, sensors, controllers, pumps, and/or filters.

Engines 10 and 52 are not limited to the configurations illustrated in FIGS. 1 and 2. For example, engine 10 or 52 may include both combustion-gas recirculation systems 22 and 56. In such embodiments, combustion-gas recirculation systems 22 and 56 may each include a separate eductor 30, or they may share a common eductor 30. Likewise, in embodiments wherein combustion-gas recirculation systems 22 and 56 share a common eductor 30, mixing chamber 32 may include separate mixing-chamber inlets 40 for combustion-gas recirculation systems 22 and 56, respectively, or combustion-gas recirculation systems 22, 56 may share a common mixing-chamber inlet 40. Additionally, in some embodiments, engine 10 or 52 may implement one or more eductors 30 in air-intake system 16 with one or more mixing-chamber inlets 40 thereof connected to systems configured to supply a gas other than combustion gas. Moreover, engine 10 or 52 may additionally include combustion-gas recirculation systems 22 and/or 56 connected to air-intake system 16other than through eductor 30.

INDUSTRIAL APPLICABILITY

The disclosed embodiments of engines 10 and 52 have potential application with any system requiring a source of power. Additionally, the disclosed embodiments of eductor 30 and combustion-gas recirculation systems 22, 56 may have application with any engine 10 or 52.

During operation of engines 10 and 52, air-intake system 16 supplies air to combustion chamber 24. Atmospheric pressure drives air into first end 36 of open inlet channel 34, through open inlet channel 34, through second end 38 of open inlet channel 34, through mixing chamber 34, through mixing-chamber outlet 42, through duct 28, to compressor 31. Compressor 31 may then pump the air through duct 29 to combustion chamber 24. During operation of the embodiment of engine 10 shown in FIG. 1, the embodiment of engine 52 shown in FIG. 2, and other embodiments of engines 10 and 52 wherein air-intake system 16 does not include a supercharger between the atmosphere and first end 36 of open inlet channel 34, air travels through open inlet channel 34 at a pressure near or below atmospheric pressure. During operation of engine 10 or 52, air may flow through open inlet channel 34 unimpeded by valves, shutters, or similar air-flow restrictions. This may promote a high flow rate of air through open inlet channel 34, which may improve the performance of engines 10, 52.

Air flowing out of second end 38 of open inlet channel 34 may promote a flow of gas from mixing-chamber inlet 40 into mixing chamber 32. As air flows out of second end 38 of open inlet channel 34 into mixing chamber 32, the air expands and drops in pressure. This creates a localized region of low pressure adjacent second end 38 of open inlet channel 34. If gas at mixing-chamber inlet 40 has a pressure higher than this localized region of low pressure, that gas will flow through mixing-chamber inlet 40, into mixing chamber 32, and toward second end 38 of open inlet channel 34. Thus, gas is drawn from duct 50 or 62. The gas may then flow with the air, through mixing chamber 32, through mixing-chamber outlet 42, through duct 28, to combustion chamber 24.

In concert with air-intake system 16 supplying air to combustion chamber 24, fuel system 18 may supply fuel to combustion chamber 24. Engines 10 and 52 combust this fuel and air in combustion chamber 24, which creates high pressure combustion gases that drive working member 14 to generate power. Some of the combustion gases produced in combustion chamber 24 may escape through spaces between housing 12 and working member 14 into non-combustion chamber 26. Additionally, exhaust system 20 routes some of the combustion gases produced in combustion chamber 24 out of combustion chamber 24.

Combustion-gas recirculation system 22 or 56 may recirculate some of the combustion gases produced in the combustion chamber 24 to air-intake system 16, for return to combustion chamber 24. In embodiments including combustion-gas recirculation system 22, a portion of the combustion gas flowing through exhaust system 20 may flow through duct 50 to mixing-chamber inlet 40. In embodiments including combustion-gas recirculation system 56, combustion gas may flow from non-combustion chamber 26, through duct 62, to mixing-chamber inlet 40. Combustion gases delivered to mixing-chamber inlet 40 by duct 50 or 62 may flow through mixing-chamber inlet 40 into mixing chamber 32, through mixing chamber 32, through mixing-chamber outlet 42, through duct 28, to combustion chamber 24. Consistent with certain embodiments, combustion gases may flow through other components, such as filters and/or valves, of combustion gas-recirculation systems 22 and/or 56 en route to combustion chamber 24. Additionally, consistent with certain embodiments wherein combustion gas recirculation systems 22 and/or 56 include one or more valves, those valves may selectively allow or prevent flow of combustion gases through duct 50 and/or 62 to mixing-chamber inlet 40. Moreover, consistent with certain embodiments wherein combustion-gas recirculation systems 22 and/or 56 include one or more pumps, those pumps may pump combustion gas through ducts 50 and/or 62 to mixing-chamber inlet 40.

It will be apparent to those skilled in the art that various modifications and variations can be implemented with engines 10, 52 and combustion-gas recirculation systems 22, 56 without departing from the scope of the disclosure. Other embodiments will be apparent to those skilled in the art from consideration of the specification and practice of engines 10, 52 and combustion-gas recirculation systems 22, 56 disclosed herein. It is intended that the disclosure of these embodiments be considered as exemplary only, with a true scope of the disclosed embodiments being indicated by the following claims and their equivalents.

What is claimed is:

1. A combustion-gas recirculation system, comprising:
   a mixing chamber with a mixing-chamber inlet and a mixing-chamber outlet;
   a duct connected to the mixing-chamber inlet;
   an open inlet channel, with a solid outer wall, that extends into the mixing chamber such that an end of the open inlet channel is disposed between the mixing-chamber inlet and the mixing-chamber outlet; and
   wherein the open inlet channel is naturally aspirated, so that air within the open inlet channel is at a pressure near or below atmospheric pressure.

2. The combustion-gas recirculation system of claim 1, wherein the mixing chamber includes an enlarged portion located between the mixing-chamber inlet and the end of the open inlet channel and having a cross-section larger than cross-sections of the mixing chamber between the end of the open inlet channel and the mixing-chamber outlet.

3. The combustion-gas recirculation system of claim 2, wherein the mixing chamber includes a tapered portion between the mixing-chamber inlet and the end of the open inlet channel.

4. The combustion-gas recirculation system of claim 3, wherein a portion of the mixing chamber between the end of the open inlet channel and the mixing-chamber outlet has a substantially constant inner cross-section.

5. The combustion-gas recirculation system of claim 2, wherein a portion of the mixing chamber between the end of the open inlet channel and the mixing-chamber outlet has a substantially constant inner cross-section.

6. The combustion-gas recirculation system of claim 1, wherein the open inlet channel has a substantially constant inner cross-section.

7. A method of supplying air and a second gas to a combustion chamber of an engine, the method comprising:
   supplying the air to an open inlet channel without directing the air through a supercharger, directing the air through the open inlet channel at a pressure near or below atmospheric pressure, through an end of the open inlet channel disposed inside a mixing chamber between a mixing-chamber inlet and a mixing-chamber outlet, through the mixing chamber, through the mixing-chamber outlet, to the combustion chamber; and
   directing the second gas through a duct, through the mixing-chamber inlet into the mixing chamber, through the mixing chamber, through the mixing-chamber outlet, to the combustion chamber.

8. The method of claim 7, wherein directing the second gas through the duct includes directing combustion gas from an exhaust system of the engine through the duct.

9. The method of claim 8, wherein the open inlet channel has a substantially constant inner cross-section.

10. The method of claim 7, wherein the open inlet channel has a substantially constant inner cross-section.

11. The method of claim 7, wherein directing the second gas through the mixing chamber includes directing the second gas through an enlarged portion of the mixing chamber located between the mixing-chamber inlet and the end of the open inlet channel and having a cross-section larger than cross-sections of the mixing chamber between the end of the open inlet channel and the mixing-chamber outlet.

12. The method of claim 11, wherein directing the second gas through the mixing chamber includes directing the second gas through a tapered portion of the mixing chamber between the mixing-chamber inlet and the end of the open inlet channel.

13. The method of claim 7, wherein directing the second gas through the duct includes directing gas from a non-combustion chamber of the engine through the duct.

14. The method of claim 13, wherein the open inlet channel has a substantially constant inner cross-section.

15. An engine, comprising:
a housing including a combustion chamber;
an air-intake system, including:
  a mixing chamber with a mixing-chamber inlet and a mixing-chamber outlet, wherein the mixing-chamber outlet is fluidly connected to the combustion chamber;
  an open inlet channel, wherein a first end of the open inlet channel is in fluid communication with the atmosphere with no supercharger upstream of the open inlet channel, and the open inlet channel extends into the mixing chamber such that a second end of the open inlet channel is disposed between the mixing-chamber inlet and the mixing-chamber outlet; and
  wherein the air-intake system is configured such that, during operation of the engine, air within the open inlet channel has a pressure near or below atmospheric pressure.

16. The engine of claim 15, further including:
an exhaust system connected to the combustion chamber and configured to route combustion gases away from the combustion chamber; and
a duct connected between the exhaust system and the mixing-chamber inlet.

17. The engine of claim 15, wherein the mixing chamber includes an enlarged portion located between the mixing-chamber inlet and the second end of the open inlet channel and having a cross-section larger than cross-sections of the mixing chamber between the second end of the open inlet channel and the mixing-chamber outlet.

18. The engine of claim 15, further including:
an exhaust system connected to the combustion chamber and configured to route combustion gases away from the combustion chamber; and
a duct connected between the exhaust system and the mixing-chamber inlet.

19. The engine of claim 18, wherein at least one cross-section of the mixing chamber between the mixing-chamber inlet and the second end of the open inlet channel is larger than cross-sections of the mixing chamber between the second end of the open inlet channel and the mixing-chamber outlet.

20. The engine of claim 15, wherein the housing further includes a non-combustion chamber, and wherein the engine further includes a duct connected between the non-combustion chamber and the mixing-chamber inlet.

21. The engine of claim 15, wherein the mixing chamber includes an enlarged portion located between the mixing-chamber inlet and the second end of the open inlet channel and having a cross-section larger than cross-sections of the mixing chamber between the second end of the open inlet channel and the mixing-chamber outlet.

22. The engine of claim 21, wherein the mixing chamber includes a tapered portion between the mixing-chamber inlet and the second end of the open inlet channel.

23. The engine of claim 15, wherein the open inlet channel has a substantially constant inner cross-section.

* * * * *